(12) United States Patent
Ji et al.

(10) Patent No.: US 10,816,911 B2
(45) Date of Patent: Oct. 27, 2020

(54) CHARGING ROLLER FOR IMAGE FORMING

(71) Applicant: HEWLETT-PACKARD DEVELOPMENT COMPANY, L.P., Spring, TX (US)

(72) Inventors: Young Phil Ji, Seongnam-si (KR); Norihiro Harada, Seognam-si (KR); Ji Soo Heo, Seongnam-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/642,655

(22) PCT Filed: May 24, 2018

(86) PCT No.: PCT/KR2018/005884
§ 371 (c)(1),
(2) Date: Feb. 27, 2020

(87) PCT Pub. No.: WO2019/066186
PCT Pub. Date: Apr. 4, 2019

(65) Prior Publication Data
US 2020/0257216 A1 Aug. 13, 2020

(30) Foreign Application Priority Data

Sep. 29, 2017 (KR) .......................... 10-2017-0128082

(51) Int. Cl.
*G03G 15/02* (2006.01)
*H01B 1/12* (2006.01)
(Continued)

(52) U.S. Cl.
CPC ..... *G03G 15/0233* (2013.01); *C08G 18/4238* (2013.01); *C08G 18/5036* (2013.01);
(Continued)

(58) Field of Classification Search
CPC ............ G03G 15/0233; C08G 18/4238; C08G 18/5036; C08G 18/77; C08K 3/04; C08L 75/08; C08D 175/06; H01B 1/122
See application file for complete search history.

(56) References Cited

U.S. PATENT DOCUMENTS 5,911,099 A 6/1999 Nakajima et al.
7,981,586 B2 * 7/2011 Uchino .............. G03G 15/0818
399/159
(Continued)

FOREIGN PATENT DOCUMENTS

JP 2008-070733 A 3/2008
JP 2008-280446 11/2008
(Continued)

*Primary Examiner* — Hoang X Ngo
(74) *Attorney, Agent, or Firm* — Staas & Halsey LLP

(57) ABSTRACT

A charging roller for an image forming apparatus is provided, which includes a shaft, an elastic layer disposed around the shaft, and a coating layer formed on the elastic layer, wherein the coating layer includes a urethane resin formed by crosslinking of a polyol mixture with polyisocyanate, and the polyol mixture includes polyester polyol and polyether polyol having 60% by weight or more and 90% by weight or less of an ethylene oxide content.

13 Claims, 3 Drawing Sheets

(51) Int. Cl.
    *C08L 75/08*    (2006.01)
    *C08G 18/42*    (2006.01)
    *C08G 18/77*    (2006.01)
    *C08K 3/04*     (2006.01)
    *C09D 175/06*   (2006.01)
    *C08G 18/50*    (2006.01)

(52) U.S. Cl.
    CPC ............... *C08G 18/77* (2013.01); *C08K 3/04* (2013.01); *C08L 75/08* (2013.01); *C09D 175/06* (2013.01); *H01B 1/122* (2013.01)

(56) References Cited

U.S. PATENT DOCUMENTS

| | | |
|---|---|---|
| 2004/0024166 A1 | 2/2004 | Hattori et al. |
| 2006/0165448 A1 | 7/2006 | Yoshinaga |
| 2015/0227074 A1* | 8/2015 | Ito .................... G03G 15/0233 252/500 |

FOREIGN PATENT DOCUMENTS

| | | |
|---|---|---|
| JP | 2010-018811 A | 1/2010 |
| JP | 2010-134431 A | 6/2010 |
| JP | 2014-174512 A | 9/2014 |
| WO | WO-2012/098590 A1 | 7/2012 |
| WO | WO-2017/131661 A1 | 8/2017 |

\* cited by examiner

[Figure 1]
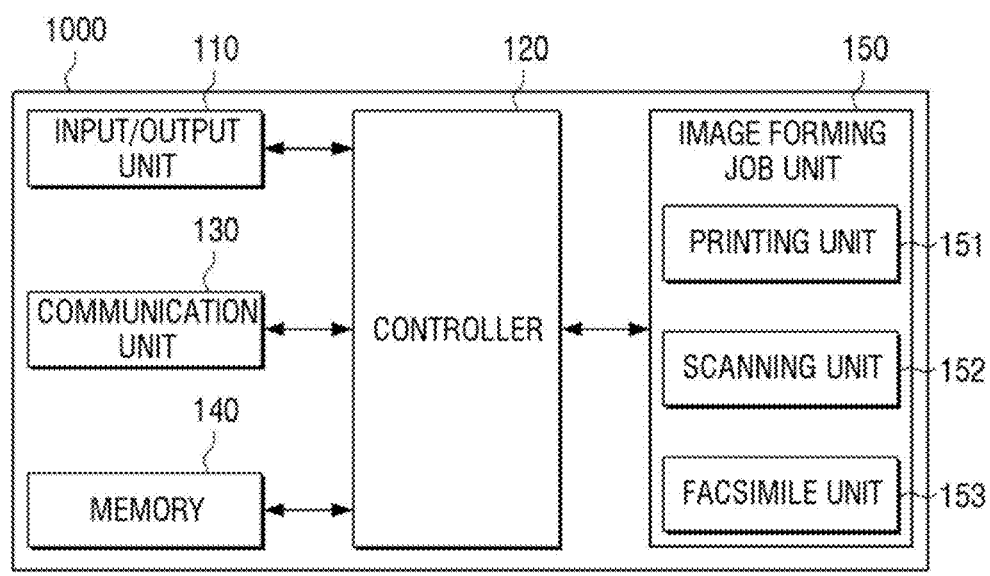

[Figure 2]
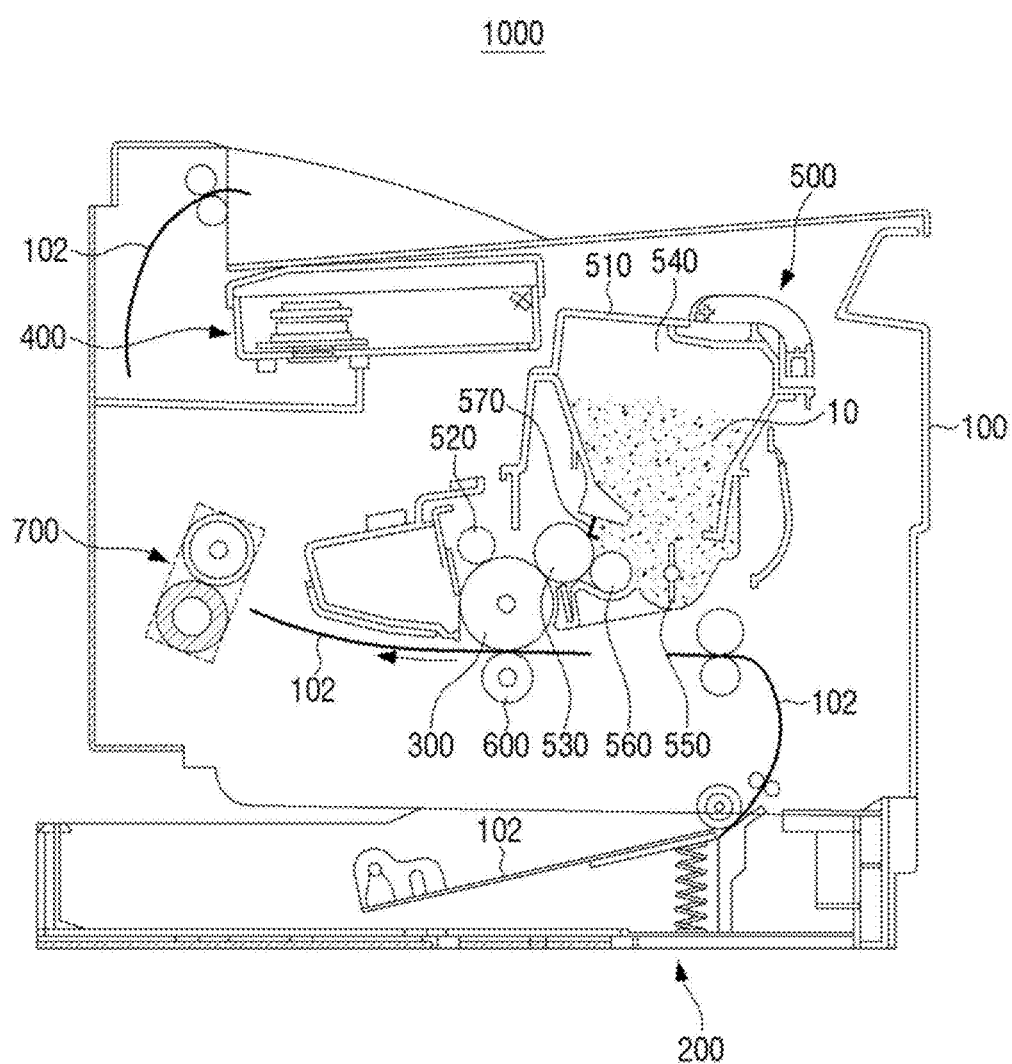

[Figure 3]
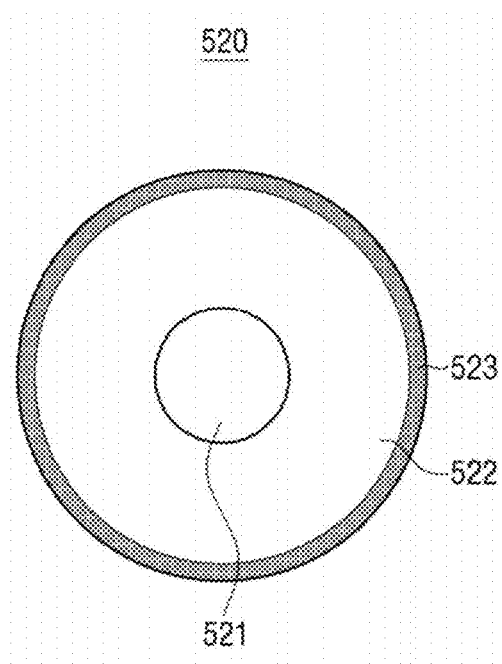
[Figure 4]
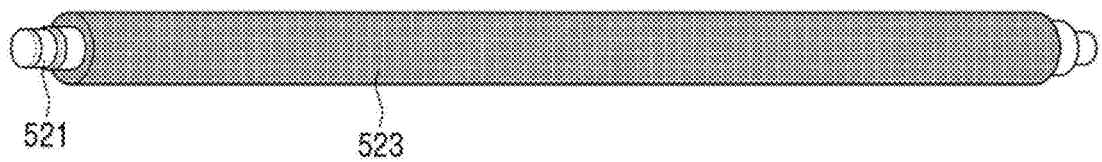

CHARGING ROLLER FOR IMAGE FORMING

CROSS-REFERENCE TO RELATED APPLICATIONS

This application is filed under 35 U.S.C. 4371 as a PCT national phase of PCT International Application No. PCT/KR2018/005884, filed on May 24, 2018, in the Korean Intellectual Property Office, which claims the priority benefit of Korean Patent Application No. 10-2017-0128082, filed on Sep. 29, 2017, in the Korean Intellectual Property Office. The contents of the International Application No. PCT/KR2018/005884 and the Korean Patent Application No. 10-2017-0128082 are incorporated by reference herein.

BACKGROUND ART

In general, an electrophotographic image forming apparatus, such as a laser printer, a facsimile, or a copy machine, includes a photosensitive body, a charging roller installed around the photosensitive body, a developing roller, a transfer roller, and the like. A developer supplied from a developing device is moved by voltages applied to the photosensitive body (OPC), the charging roller, the developing roller, and the transfer roller to cause a specific image to be formed on a print medium.

For example, the charging roller charges a surface of the photosensitive body that is a charged body with a specific voltage, and light scanned by an exposure unit causes an electrostatic latent image corresponding to print data to be formed on the surface of the charged photosensitive body. Then, the developing roller develops the electrostatic latent image into a developer image by supplying the developer to the photosensitive body. The transfer roller transfers the developer image onto the print medium passing between the photosensitive body and the transfer roller.

DISCLOSURE OF INVENTION

Brief Description of Drawings

FIG. 1 is a block diagram explaining the configuration of an image forming apparatus according to an example of the present disclosure;

FIG. 2 is a view explaining the internal configuration of an image forming apparatus according to an example of the present disclosure;

FIG. 3 is a cross-sectional view of a charging roller for an image forming apparatus according to an example of the present disclosure; and FIG. 4 is a perspective view of a charging roller for an image forming apparatus according to an example of the present disclosure.

MODE FOR THE INVENTION

In forming an electrostatic latent image in the related art, a contact charging method is used, in which a charging roller becomes in direct contact with the surface of a photosensitive body that is an image carrier to perform a charging process. In particular, a roller charging method using an electrically conductive roller as a charging roller can be used in terms of charging safety. According to this method, the surface of the photosensitive body is charged by generating a micro discharge in the neighborhood of contact nips of the photosensitive body and the charging roller through applying of a voltage to a conductive support (shaft) using the charging roller provided by disposing a conductive elastic layer on an outer periphery of the shaft and coating a resistance layer on an outer periphery of the conductive elastic layer.

Recently, more improved electrophotographic image quality and high process speed and high durability of an electrophotographic image forming apparatus are required. Particularly, in case of a high-end laser printer, more than twice the number of sheets being developed is expected as compared with a low-end printer, and thus durability of the charging roller becomes more needed.

Hereinafter, various examples will be described in detail with reference to the accompanying drawings. Various changes and modifications of the examples described hereinafter may be implemented. In order to explain the features of the examples more accurately, detailed explanation of matters known to those skilled in the art to which the following examples of the present disclosure pertain will be omitted.

On the other hand, in the description, if it is described that a certain portion is connected to another portion, it means not only a direct connection but also an indirect connection through another portion. Further, if it is described that a certain portion includes another portion, it means that the certain portion does not exclude other portions, but may further include the other portions unless specially described on the contrary.

In the description, "image forming job" may mean various image-related jobs (e.g., printing, scanning, and faxing), such as forming of an image or generation/storage/transmission of an image file, and "job" may mean not only image forming job but also a series of processes required to perform the image forming job.

Further, "image forming apparatus" is an apparatus for printing print data generated from a terminal device such as a computer on a recording paper. Examples of such image forming apparatuses may be a copy machine, a printer, a facsimile, and a multifunction printer (MFP) in which the functions of the copy machine, printer, and facsimile are compositely implemented through one device. The image forming apparatuses may mean all devices capable of performing the image forming job, such as the printer, scanner, fax machine, multifunction printer (MFP), and display device.

Further, "hard copy" may mean an operation of outputting an image onto a printing medium, such as paper, and 'soft copy" may mean an operation of outputting an image onto a display device, such as a TV or a monitor.

Further, "content" may mean all kinds of data becoming the subject of an image forming job, such as a photo, an image, or a document file.

Further, "print data" may mean data converted into a format that can be printed by a printer. On the other hand, if the printer supports direct printing, a file itself may be print data.

Further, "user" may mean a person who performs an operation related to an image forming job using an image forming apparatus or a device connected to the image forming apparatus by wire or wirelessly. Further, "manager" may mean a person who has an authority to access all functions of an image forming apparatus and the system. The "manager" and "user" may be the same person.

In the present disclosure, inclusion in the range of a to b means inclusion in the range including a and b as boundaries, and in other words, a and b are not excluded.

Hereinafter, the present disclosure will be described in detail with reference to the accompanying drawings. In describing the present disclosure, related known functions or configurations are not described in detail since they would obscure the subject matter of the disclosure in unnecessary detail.

FIG. 1 is a block diagram explaining the configuration of an image forming apparatus according to an example of the present disclosure. Referring to FIG. 1, an image forming apparatus 1000 according to an example may include an input/output unit 110, a controller 120, a communication unit 130, a storage 140, and an image forming job unit 150. Further, although not illustrated, the image forming apparatus 1000 may further include a power supply for supplying a power to the respective constituent elements.

The input/output unit 110 may include an inputter for receiving an input for performing an image forming job from a user, and a display for displaying information, such as the performance result of the image forming job or a state of the image forming apparatus 1000. For example, the input/output unit 110 may include an operation panel receiving a user input and a display displaying a screen. Further, the display and the operation panel may be configured as one constituent element, such as a touch screen.

The input/output unit 110 may include devices capable of receiving various types of user inputs, such as a keyboard, physical button, touch screen, camera, and microphone, and may further include a display panel or a speaker. The display panel may be an LCD panel or an OLED panel, but is not limited thereto. The input/output unit 110 may include a device supporting various inputs/outputs.

The input/output unit 110 may be provided with an independent control system. That is, separately from the controller 120 of the image forming apparatus 1000, the input/output unit 110 may be provided with a control system (controller and memory) for controlling a user interface (UI) provided in the input/output unit 110. Further, the control system of the input/output unit 110 may include an operating system (OS) for providing a UI and programs, such as applications for supporting various functions.

On the other hand, the input/output unit 110 may be separable from the image forming apparatus 1000. For example, the input/output unit 110 may operate in a similar manner to a tablet in case of being separated from the image forming apparatus 1000, whereas it may perform an input/output function in case of being coupled to the image forming apparatus 1000. In case of the separable input/output unit 110, it may further include a communicator for performing communication with an external device.

The controller 120 controls the whole operation of the image forming apparatus 1000, and may include a processor, such as CPU, ASIC, or SoC, a memory, and a ROM. The controller 120 may control other constituent elements included in the image forming apparatus 1000 to perform operations corresponding to the user input received through the input/output unit 110.

For example, the controller 120 may execute a program stored in the storage 140, read a file stored in the storage 140, or store a new file in the storage.

The communication unit 130 may perform wired/wireless communication with another device or a network (e.g., local area network (LAN), Internet, or public switched telephone network (PSTN)). For this, the communication unit 130 may include a communication module supporting at least one of various wired/wireless communication methods. For example, the communication module may be in the form of a chipset, or may be a sticker/barcode (e.g., sticker including an NFC tag) including necessary information for communication.

The wireless communication may include at least one of wireless fidelity (Wi-Fi), Wi-Fi Direct, Bluetooth, ultra wide band (UWB), and near field communication (NFC). The wired communication may include, for example, at least one of Ethernet, USB, and high definition multimedia interface (HDMI).

The communication unit 130 may be connected to an external device located outside the image forming apparatus 1000 to transmit/receive a signal or data. The image forming apparatus 1000 may be connected to an external device 200 through the communication unit 130. The external device may be, for example, a smart phone, a tablet, a PC, a home appliance, a medical device, a camera, or a wearable device.

The communication unit 130 may transfer a signal or data received from the external device to the controller 120, or may transmit a signal or data generated by the controller 120 to the external device. For example, if the communication unit 130 receives a print command signal or print data from the external device, the controller 120 may output the received print data through a printing unit 151.

In the storage 140, programs such as applications and various kinds of data such as files may be installed and stored. The controller 120 may access and use data stored in the storage 140, or may store new data in the storage 140. Further, the controller 120 may execute a program installed in the storage 140. Further, the controller 120 may install an application received from outside in the storage 140.

On the other hand, the storage 140 may be implemented by a storage medium (e.g., HDD or SDD) in the image forming apparatus 1000 and an external storage medium, for example, a removable disk including a USB memory or a web server through a network.

The image forming job unit 150 may perform an image forming job, such as printing, scanning, or faxing.

Referring to FIG. 1, it is illustrated that the image forming job unit 150 includes the printing unit 151, a scanning unit 152, and a facsimile unit 153. However, if needed, the image forming job unit 150 may include only parts of such constituent elements, or may further include a constituent element for performing a different kind of image forming job.

The scanning unit 152 may read an image recorded on a manuscript by irradiating the manuscript with light and receiving the reflected light. As an image sensor for reading the image from the manuscript, for example, a charge coupled device (CCD) or a contact type image sensor (CIS) may be adopted. The scanning unit 152 may have a flatbed structure, in which a manuscript is located on a fixed position and an image sensor moves to read an image on the manuscript, a document feed structure, in which an image sensor is located on a fixed position and a manuscript moves to be read, or a combined structure thereof.

The facsimile unit 153 may share the constituent element for scanning an image with the scanning unit 152, and may share the constituent element for printing a received file with the printing unit 151. The facsimile unit 153 may convert a scanned file into fax data to transmit the converted fax data to a destination, or may receive fax data from outside.

The printing unit 151 may form an image on a recording medium through various printing methods, such as an electrophotographic method, an inkjet method, a thermal transfer method, and a heat sensitive method. The printing unit 151 may form an image on a recording medium through a series of processes including exposure, development, transfer, and fusing processes. An example of a process of forming an image on a recording medium will be described with reference to FIG. 2.

FIG. 2 illustrates an image forming apparatus according to an example of the present disclosure.

Referring to FIG. 2, an image forming apparatus 1000 according to an example of the present disclosure may include a main body case 100, a paper feeder 200, a photosensitive body 300, an optical scanning unit 400, a development cartridge 500, a transfer roller 600, and a fusing unit 700.

The main body case 100 forms an external appearance of the image forming apparatus 1000. The paper feeder 200 is provided in the main body case 100, and paper 102 is loaded in the paper feeder 200.

The photosensitive body 300 has the shape of a cylindrical drum extending to a specific length corresponding to the width of the paper 102. The photosensitive body 300 may be called a photosensitive drum or a photosensitive belt in accordance with the shape thereof.

The photosensitive body 300 is charged to an electric potential having a specific polarity by a charging roller 520. An electrostatic latent image is formed on the photosensitive body 300 of which the outer periphery is uniformly charged due to an electric potential difference caused by beams scanned by the optical scanning unit 400. A toner 10 is supplied onto the electrostatic latent image by a development roller 530, and an image caused by the toner 10 is transferred onto the paper 102 passing between the photosensitive body 300 and the transfer roller 600.

The optical scanning unit 400 irradiates the photosensitive body 300 with beams corresponding to image data to be formed on the paper 102 to form the electrostatic latent image on the photosensitive body 300. The optical scanning unit 400 may include a laser scanning unit using a laser diode as a light source, and the laser scanning unit may be replaced by various types of light sources.

The development cartridge 500 supplies the toner 10 that is a developer onto the electrostatic latent image of the photosensitive body 300. The development cartridge 500 includes a cartridge case 510, a charging roller 520, a development roller 530, a toner storage 540, a hopper 550, a supply roller 560, and a doctor blade 570.

The charging roller 520 is rotated in a state where it comes in contact with the photosensitive body 300 to charge the surface of the photosensitive body 300 with a uniform electric potential value. The charging roller 520 may be implemented in the form of a corona charger, charging roller, or charging brush.

The development roller 530 supplies the toner 10 onto the electrostatic latent image formed on the photosensitive body 300. The toner storage 540 is formed in the cartridge case 510 to store the toner 10 therein. The hopper 550 is provided in the toner storage 540. The supply roller 560 is provided in the toner storage 540 to supply the toner 10 to the development roller 530. The doctor blade 570 is extended from the toner storage 540 to come in contact with the development roller 530. The charging roller 520 is provided in the cartridge case 510 to be rotated in a state where it comes in contact with the photosensitive body 300. A charging bias is applied to the charging roller 520 to charge the outer periphery of the photosensitive body 300 with the same electric potential value. If beams are irradiated from the optical scanning unit 400 to the photosensitive body 300 charged with the same electric potential value through the charging roller 520, the electric potential value at points where the beams are irradiated is changed due to the photoconductivity characteristics of the photosensitive body 300. Accordingly, an electric potential difference occurs between the points where the beams are irradiated and the points where the beams are not irradiated on the photosensitive body 300, and thus the electrostatic latent image due to the electric potential difference is formed on the photosensitive body 300. The development roller 530 is installed adjacent to the toner storage 540, and is rotated in an opposite direction to the rotating direction of the photosensitive body 300. The development roller 530 to which a development bias is applied is rotated in contact with the supply roller 560, and the toner 10 from the supply roller 560 is attached to the development roller 530 due to the electric potential difference between the supply roller 560 and the development roller 530. The development roller 530 to which the toner 10 is attached is rotated in contact with the photosensitive body 300, so that the attached toner 10 is supplied onto the electrostatic latent image on the photosensitive body 300. The toner storage 540 is formed as an accommodation space for storing the toner 10 in the cartridge case 510. The toner storage 540 has an opening formed on one side thereof on which the development roller 530 is provided, and the stored toner 10 is supplied to the development roller 530 by the supply roller 560. At least one hopper 550 is installed in the toner storage 540. The hopper 550 is rotated in the toner storage 540 to convey the toner 10 toward the supply roller 560 and to agitate the toner 10 so as to prevent hardening of the toner 10 and improve fluidity of the toner 10. Further, the hopper 550 agitates the toner 10 to help the toner 10 charged with a specific electric potential value. The supply roller 560 is provided on a lower side of the toner storage 540 to be rotated in contact with the development roller 530. The supply roller 560 supplies the toner 10 conveyed by the hopper 550 to the development roller 530. The supply roller 560 is rotated in the same direction as the direction of the development roller 530, that is, in a direction in which they cross each other. Through this, the toner 10 having a frictional force through passing between the supply roller 560 and the development roller 530 is charged with the specific electric potential value, and a proper amount of the toner 10 is attached onto the development roller 530. The doctor blade 570 comes in contact with the development roller 530 with a specific holding pressure. Through this, the doctor blade 570 secures uniformity of the amount of toner 10 supplied from the supply roller 560 and attached to the development roller 530, that is, mass of the toner 10 per unit area of the development roller 530 (M/A [g/cm$^2$]. Further, the doctor blade 570 charges the toner 10 attached to the development roller 530 with the specific electric potential value. For this, the doctor blade 570 includes a conducting agent, and may be provided to have a constant electric potential value through applying of a power thereto.

The transfer roller 600 is rotated in contact with the photosensitive body 300 to transfer an image due to the toner 10 onto the paper 102. The fusing unit 700 fuses the image due to the toner 10 on the paper 102.

The toner as described above is used when the image forming job is performed, and is exhausted after usage over a specific time. In this case, a toner storage unit (e.g., the development cartridge 500) itself may be replaced. Components or constituent elements that can be replaced in the use process of the image forming apparatus as described above are called expendable units or replaceable units. For proper management of the corresponding expendable unit, a memory (or CRUM chip) may be attached to the expendable unit.

On the other hand, the type of the image forming apparatus as illustrated in FIG. 2 is merely for an example, and the present disclosure can be applied to various types of image forming apparatuses. For example, there may be a single path type having a plurality of photosensitive bodies to match respective imaging units or a multipath type having one photosensitive body.

Hereinafter, the charging roller 520 of the image forming apparatus 1000 as described above according to various examples of the present disclosure will be described.

FIG. 3 is a view explaining the shape of the charging roller according to an example of the present disclosure.

Referring to FIG. 3, the charging roller 520 includes a roller-shaped shaft 521 located in the center, an elastic layer 522 surrounding the shaft, and a coating layer 523 formed on the elastic layer 522.

FIG. 4 is a perspective view of the charging roller 520 according to an example of the present disclosure. Hereinafter, configurations of the charging roller 520 will be described with reference to FIGS. 3 and 4.

Shaft (Support)

The shaft 521 has conductivity and serves to adhesively support the elastic layer 522. Any conducting agent may be used as a material of the shaft 521. For example, the material may be aluminum, iron, stainless steel (SUS), or stainless use machinability (SUM). The shaft 521 may be plated, and a material of which an outer periphery can be well coated with adhesives or primers can be used. The shaft 521 may be, for example, in a cylindrical shape having an outer diameter of 4 to 20 mm.

Elastic Layer

The elastic layer 522 is formed to cover an outer periphery of the shaft 521.

The elastic layer 522 may be formed by mixing a conducting agent and a polymeric elastomer.

The polymeric elastomer may be, for example, epichlorohydrine rubber (ECO), nitrile rubber, acrylonitrile-butadiene rubber (NBR), polyurethane, silicone rubber, ethylene-propylene rubber, ethylenepropylenediene rubber (EPDM), natural rubber, styrene-butadiene rubber (SBR), butadiene rubber, isoprene rubber, butyl rubber, chloroprene rubber, acrylic rubber, or a mixture thereof.

Although the elastic layer 522 is not separately limited, epichlorohydrine rubber (ECO) having molecules in which ethylene oxide (EO) is contained can be used since it has an ionic conductivity and the electrical resistance thereof is stabilized to be relatively low.

The charging roller 520 may be arranged to come in contact with the photosensitive body 300 (contact development type), or may be arranged to be apart from the photosensitive body (non-contact development type).

In case of one-component contact development type, the elastic layer 522 can be of Asker-A TYPE using a longitude of 25° to 45°, whereas in case of one-component non-contact development type, the elastic layer 522 can be of Asker-A TYPE using a longitude of 40° to 65°. However, since the used longitude is determined in accordance with a printer speed, lifespan, and cost, it may be changed in accordance with the development type.

The elastic layer 522 may have, for example, a thickness of 0.5 mm to 8.0 mm. In such a thickness range, the charging roller 520 may show superior elasticity, secure recovery against deformation, and reduce a stress against the toner. In case of the one-component non-contact development type, the thickness of the elastic layer 522 may be, for example, 0.5 mm to 2.0 mm, whereas in case of the one-component contact development type, the thickness of the elastic layer 522 may be, for example, 1.5 mm to 8.0 mm.

The conducting agent that may be included in the elastic layer 522 may include at least one of an ionic conducting agent and an electronic conducting agent. In view of the resistance stability of the elastic layer 522, the elastic layer 522 may contain the ionic conducting agent. Since the ionic conducting agent is uniformly dispersed in the polymeric elastomer to uniform the electrical resistance of the elastic layer 522, uniform charging can be achieved even if the charging roller 520 is used for application of a DC voltage only.

An available ionic conducting agent is not specially limited, but may be properly selected in accordance with the purpose thereof. For example, the ionic conducting agent may be alkali metal salt, alkaline earth metal salt, perchlorate of the quaternary ammonium, chlorate, hydrochloride, bromate, iodate, hydrogen tetrafluoroborate, sulfate, trifluoromethyl sulfate, sulfonate, or trifluoromethyl sulfate. These may be used as one kind alone, or in a mixture of two kinds or more. The alkali metal salt is not specially limited, but may be properly selected in accordance with the purpose thereof. For example, the alkali metal salt may be lithium salt, sodium salt, or potassium salt. These may be used as one kind alone, or in a mixture of two kinds or more. Examples of lithium salt may be $Li[B(C_{14}H_{10}O_3)_2]$, $Li(CF_3SO_2)_2N$, $Li(C_2F_5SO_2)_2N$, $LiClO_4$, $LiBF_4$, $LiPF_6$, $LiCF_3SO_3$, $LiAsF_6$, and $LiC_4F_9SO_3$.

The quaternary ammonium salt may be a cationic active agent, such as lauryl trimethylammonium chloride, stearyl trimethylammonium chloride, octadecyl trimethylammonium chloride, dodecyl trimethylammonium chloride, hexadecyl trimethylammonium chloride, torioctylpropylammonium bromide, or modified aliphatic dimethyl ethyl ammonium; an amphoteric active agent, such as lauryl betaine, stearyltaine, or dimethyl alkyl lauryl betaine; perchloric acid tetraethyl ammonium, perchloric acid tetraethyl ammonium, or perchloric acid trimethyl octadecyl ammonium.

For example, the mixing amount of the ionic conducting agent is in the range of 0.01 to 10 parts by weight against 100 parts by weight of polymer elastomer, and, for another example, the mixing amount of the ionic conducting agent is in the range of 0.5 to 5 parts by weight. The ionic conducting agents may be used as one kind alone, or in a mixture of two kinds or more, and the electron conducting agent and the ionic conducting agent may be combined with each other.

As the electron conducting agent, for example, carbon black may be used, and the kind of the carbon black is not separately limited. The carbon black may be a conductive carbon black, such as carbon black for ink, ketjenblack, or acetylene black for the purpose of good dispersion of the paint; carbon black for rubber, such as SAF, ISAF, HAF, FEF, GPF, SRF, FT, or MT, thermal dispersion carbon black, natural graphite, or artificial graphite. Further, as the electron conducting agent, for example, metal oxide, such as antimony-doped tin oxide, ITO, tin oxide, titan oxide, or zinc oxide; metal, such as nickel, copper, silver, or germanium; conductive polymer, such as polyaniline, polypyrrole, or polyacetylene; or conductive whisker, such as carbon whisker, graphite whisker, titanium carbide whisker, conductive potassium titanate whisker, conductive barium titanate whisker, conductive titanium oxide whisker, or conductive zinc oxide whisker, may be used. It may not be preferable to use a large mixing amount of the electron conducting agent in order to make a small electric resistance difference and not to heighten the hardness. It may be preferable that the mixing amount of the electron conducting agent is in the range of 30 parts by weight or less against 100 parts by weight of polymer elastomer, and it may be more preferable that the mixing amount of the electron conducting agent is in the range of 10 parts by weight or less.

For example, the resistance value of the elastic layer 522 through mixing of a conductor is 1.0E+03~1.0E+10 W, and, for another example, the resistance value of the elastic layer is 1.0E+04~1.0E+08 W. If the resistance value of the elastic layer is smaller than 1.0E+03 W, charges make the photosensitive body 300 leak, and thus imbalance of the electric resistance occurs to cause image spot occurrence and hardness increase. Accordingly, uniform contact with the photosensitive body 300 is unable to be obtained, and image blurring occurs easily. If the resistance value of the elastic layer exceeds 1.0E+10 W, background (B/G) image may easily occur.

If needed, in addition to the above-described conducting agents, other conducting agents, fillers, crosslinking agents, foaming agents, and other rubber additives may be added to the elastic layer 522.

Coating Layer

The coating layer 523 is formed on the elastic layer 522.

The coating layer 523 according to the present disclosure may include urethane resin formed by crosslinking of a polyol mixture including polyester polyol and polyether polyol with polyisocyanate. Since the polyester polyol and the polyether polyol are used together, their respective properties can be obtained.

The urethane resin obtained by crosslinking of polyester polyol with polyisocyanate has prominent abrasion resistance under relatively low hardness. However, the characteristics of the urethane resin that can be obtained using the polyester polyol may easily deteriorate at low temperature, and if the urethane resin is used for a long time under a low-temperature environment, the electrical resistance value thereof may be easily changed to cause background (B/G) images to occur. Further, ester-based urethane may be easily hydrolyzed, and if it is used for a long time in high-temperature and high-humidity environment, the characteristics thereof may be changed.

The urethane resin obtained by crosslinking of polyether polyol with polyisocyanate has prominent low-temperature flexibility and superior stability since the electrical resistance thereof is relatively low.

However, as known in the related art, polyester polyol and polyether polyol generally have weak compatibility to easily cause separation or curing inferiority, and thus pre-polymerization thereof is performed in the related art.

In the present disclosure, polyether polyol having 60% by weight or more and 90% by weight or less of ethylene oxide (EO) content is used to solve the compatibility with polyester polyol. Polyether polyol having 60% by weight or more and 90% by weight or less of ethylene oxide (EO) content has good compatibility with polyester polyol, and in addition, the coating layer 523 produced using the same has prominent low-temperature flexibility and superior stability since the electrical resistance thereof is relatively low. Further, the coating layer has prominent resistance stability under low hardness.

The coating layer 523 according to the present disclosure may include a urethane resin formed by crosslinking of a polyol mixture, which includes polyester polyol and polyether polyol having 60% by weight or more and 90% by weight or less of ethylene oxide (EO) content, with polyisocyanate. For example, the content ratio between polyester polyol and polyether polyol is in the range of 8:2 to 2:8. If the content ratio of either side is too low, the improvement effect becomes lowered.

As the polyester polyol, polycaprolactone based polyol or adipic acid based polyol may be used. The polyester polyol can be obtained, for example, by esterification between a compound having two or more hydroxyl groups (OH) and polybasic acid, or through ring-opening addition of ring-shaped esters, such as e-caprolactone, b-butyrolactone, g-butyrolactone, g-valerolactone, and d-valerolactone with a compound having two or more hydroxyl groups as an initiator. For example, the polyester polyol is obtained by ring-opening addition of ring-shaped esters of e-caprolactone.

On the other hand, although polylacton based polyol may be discriminated from polyester based polyol, it will be hereinafter considered as a kind of polyester polyol.

As the compound having two or more hydroxyl groups as described above, for example, a glycol compound, such as ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-diclohexanediol, or 1,4-diclohexanedimethanol; a glycol compound having a branch structure, such as 2-methyl-1, 5-pentanedio, 3-methyl-1, 1,2-butanediol, 1,3-butandiol, 2-butyl-2-ethyl-1, 3-propanediol, 1,2-propanediol, 2-methyl-1, 3-propanediol, neopentyl glycol, 2-isopropyl-1, 4-butanediol, 2,4-dimethyl-1, 5-pentanediol, 2,4-deethyl-1, 5-pentanediol, 2-ethyl-1, 3-hexanediol, 2-ethyl-1, 6-hexanediol, 3,5-pentanediol, 2-methyl-1, or 8-octanediol; trimethylolpropane, trimethylol ethane, pentaerythritol, or sorbitol may be used. Such compounds may be used as one kind alone, or in a mixture of two kinds or more.

Further, among ester based polyols, those in a liquid state at room temperature can be used since they are easy to handle, it is difficult that they are cohered in a coating solution, and image spot does not occur. Further, the ester based polyols having three or more hydroxyl groups (OH) can be used since they have small permanent set (C-set) and good stability. As the ester based polyols having three or more hydroxyl groups in a liquid state at room temperature, ester based polyols that can be obtained by copolymerizing adipic acid, trimethylpropane, and 3-methyl-1.5-pentanediol can be used in adipates.

As the polybasic acid as described above, for example, adipic acid, succinic acid, azelaic acid, sebacate, dodecanezicarboxylic acid, maleic anhydride, fumaric acid, 1,3-cyclopentanedicarboxyl acid, 1,4-cyclohexanedicarboxyl acid, or anhydride thereof may be used. Such polybasic acids may be used as one kind alone, or in a mixture of two kinds or more.

As the polyether polyol having 60% by weight or more and 90% by weight or less of ethylene oxide (EO) content, for example, a difunctional glycol, such as ethylene oxide-polypropylene oxide copolymer, or tri or more functional polyether polyol may be used.

For example, the ethylene oxide-polypropylene oxide copolymer is a random copolymer since low crystalline is obtained to lower the hardness of the urethane resin.

The polyether polyol having 60% by weight or more and 90% by weight or less of ethylene oxide (EO) content may be a polyoxypropylene polyol created by random addition and/or block addition of alkylene oxide having a carbon number of 2 to 6 to the compound having two or more hydroxyl groups as described above. For example, the polyether polyol may be polyoxyethylene polyoxypropylene polyol or polyoxyethylene polyoxytetramethylene polyol. Among them, tri or more functional polyoxyethylene polyoxypropylene polyol, of which the molecule end obtained through random addition polymerization of ethylene oxide and propylene oxide is ethylene oxide can be selected. The tri or more functional polyoxyethylene polyoxypropylene polyol rather than difunctional one is advantageous from the viewpoint of image defect occurrence in low-temperature and low-humidity environment.

As the polyisocyanate crosslinking with the polyol mixture including the polyester polyol and the polyether polyol having 60% by weight or more and 90% by weight or less of ethylene oxide (EO) content, trilene diisocyanate (TDI), diphenylmethane diiscyanate (MDI), crude diphenylmethane diisocyanate, isoprene diisocyanate (IPDI), hydrogenated diphenylmethane diisocyanate, hydrogenated toluene diiscyanate, or hexamethylene diisocyanate (HDI) may be used. In particular, from the viewpoint of prevention of C-set deformation that means a phenomenon that the charging roller 520 left alone in a deformed state for a long time without being used on the contact portion between the charging roller 520 and the photosensitive body 300 does not return to its original shape, for example, the polyisocyanate is isocyanurate type trimer (HDI) of isocyanurate modified polyisocyanatohexamethylenediisocyanate derived from hexamethylene diisocyanate, which has good flexibility. Further, blocked polyisocyanate obtained by reacting the HDI and a blocking agent can be used since it has prominent storage stability and superior production stability.

The blocking agent is, for example, methyl ethyl ketone oxime having good storage stability and productivity and capable of adjusting a dissociation temperature in the range of 120° C. to 160° C.

Regarding the addition amount of polyisocyanate, for example, the mole ratio of isocyanate group (NCO) of polyisocyanate to the whole hydroxyl group (OH) of a polyol mixture ([NCO]/[OH]) is within the range of 1.2 to 2.5. As compared with the polyester based polyol, the poly ether based polyol has reactivity that may be easily lowered. If the mole ratio ([NCO]/[OH]) is smaller than 1.2, unreacted materials may easily remain, whereas if the mole ratio ([NCO]/[OH]) is larger than 2.5, low-temperature flexibility may be easily lowered.

In addition to the urethane resin formed as described above, the coating layer 523 may contain a small amount of other resin components for the purpose of reforming within the range in which the features of the present disclosure are not hampered. As the other resin components, silicone graft polymer or acrylic resin and fluorine based resin may be used for the purpose of improving pollution adhesiveness of a surface.

If needed, the coating layer 523 may additionally include other additives, such as a conducting agent, leveling agent, filler such as silica, anti-former, surface reformer, and dispersant. In this case, the conducting agent may be an ionic conducting agent or an electron conducting agent.

The ionic conducting agent that can be used for the urethane resin of the coating layer 523 may be alkali metal salt, alkaline earth metal salt, or quaternary ammonium salt, which can be used for the elastic layer 522 as described above. In particular, since an ionic liquid appearing as a chemical structure of $(n\text{-}Bu)_3MeN^+\text{—}N(SO_2CF_3)_2$ has prominent thermal stability and can be easily dispersed on the urethane resin, it can be used.

For example, the mixing amount of the ionic conducting agent is included in a range of 0.01 to 10 parts by weight against 100 parts by weight of the urethane resin, and, for another example, the mixing amount of the ionic conducting agent is included in a range of 0.5 parts or more by weight and 5 parts by weight or less.

As the electron conducting agent, the electron conducting agent that can be used for the elastic layer 522 as described above may be used, and oxidized carbon black having good dispersion on the coating layer 523 may be used.

For example, the mixing amount of the electron conducting agent is in the range of 0.5 parts by weight or more and 10 parts by weight or less against 100 parts by weight of urethane resin.

In order to stabilize chargeability of the photosensitive body 300, for example, particles (particles for forming illumination) are contained to form unevenness on the surface of the coating layer 523. The particles for forming illumination may be spherical inorganic particles, such as resin particles or silica particles. For the resin particles, for example, acrylic resin, styrene resin, polyamide resin, silicone resin, vinyl chloride resin, vinylidene resin, acrylonitrile resin, fluoroplastic, phenol resin, polyester resin, melamine resin, urethane resin, olefin resin, or epoxy resin may be used. Among them, acrylic resin can be used as an example, for charge stability, and poly(methyl methacrylate) (PMMA) particles can be used as an example, for the acrylic resin. The diameter of the particle may be, for example, 5 to 50 μm.

For example, monodispersed PMMA particles having an average particle diameter of 18 to 30 μm are included in the range of 5 parts by weight or more and 30 parts by weight or less against 100 parts by weight of a matrix resin component (group by sum of polyol mixture and isocyanate) as particles for forming the surface illumination.

As other additives in addition to those as described above, for example, fillers such as silica or titan oxide, leveling agent, surface friction reducer, pollution prevention agent, anti-former, dispersant, and thickener may be included in the coating layer 523. Such additives may be used as one kind alone, or in a mixture of two kinds or more.

Although not specially limited, for example, the coating layer 523 has a thickness of 1 to 30 μm, and, for another example, the thickness of the coating layer is in the range of 2 to 15 μm.

If the thickness of the coating layer 523 is smaller than 1 μm, durability may deteriorate due to abrasion caused by a long-term use, and the performance for preventing a phenomenon that non-reacted crosslinking materials soak out through the surface of the elastic layer is lowered. If the thickness of the coating layer 523 exceeds 30 μm, the coating layer may be hardened with lowered flexibility, and thus the durability may deteriorate. In this case, the coating layer may split due to the use thereof, or toner may be damaged to cause the toner to adhere to the photosensitive body 300 or the blade, resulting in occurrence of image inferiority.

A method for forming the coating layer 523 is not specially limited, but, for example, a method for mixing, spraying by dipping, spraying, or roll coating, and then drying paints including respective components of the coating layer 523 may be used.

For example, 100% by weight of the whole polyol mixture of the coating layer 523 may include 20% by weight or more and 80% by weight or less of polyester polyol and 20% by weight or more and 80% by weight or less of polyether polyol. Further, polyether polyol having an average molecular weight in the range of 4000 to 6000 has superior reactivity and superior low-temperature characteristics.

Among compositions used to form the coating layer 523 of the charging roller 520, for example, 0.5 parts by weight or more and 5 parts by weight or less of the ionic conducting agent and 0.5 parts by weight or more and 10 parts by weight or less of the carbon black are included against 100 parts by weight of the matrix resin component (group by sum of polyol mixture and isocyanate) in order to obtain proper electric resistance and flexibility. More than 5 parts by weight of the ionic conducting agent is contained, migration (bleed out_flowing of an internal material out of a surface layer) phenomenon easily occurs. For example, the ionic conducting agent is an ionic liquid having a chemical structure of $(n\text{-}Bu)_3MeN^+\text{---}N(SO_2CF_3)_2$ as below.

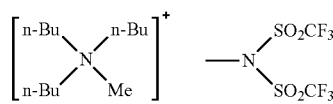

Here, n-Bu denotes n-Butyl, and Me denotes Methyl.

If the above-described ionic liquid is used as the ionic conducting agent, it has good dispersion on the resin, is superior in controlling the electric resistance value, and is stable at high temperature. Further, the ionic liquid is not volatilized during drying or curing, and its effect is not reduced by decomposition or the like.

For example, the polyisocyanate for the urethane resin by curing the polyol mixture is hexamethylene diisocyanate trimer, and also is blocked polyisocyanate having a dissociation temperature that is equal to or higher than 120° C. and equal to or lower than 160° C. By using the hexamethylene diisocyanate trimer, it is possible to obtain the urethane resin having prominent flexibility and good C-set characteristics. Further, by using the blocked polyisocyanate having the dissociation temperature that is equal to or higher than 120° C. and equal to or lower than 160° C., it is possible to obtain a composition having good storage stability of the dispersion liquid and good curing stability.

For example, an added amount of polyisocyanate can be controlled so that the mole ratio of an isocyanate group (NCO) of polyisocyanate to the hydroxyl group (OH) of the whole polyol mixture ([NCO]/[OH]) is within the range of 1.2 to 2.5. In this range, the charging roller 520 has low surface adhesiveness and proper and stable electric resistance. If the mole ratio ([NCO]/[OH]) becomes lower than the above-described range, the polyether polyol may not be sufficiently cured to increase the adhesiveness. Further, if the mole ratio ([NCO]/[OH]) is higher than the above-described range, the low-temperature flexibility may become worse, and the ionic conductivity may deteriorate.

For example, the coating layer 523 contains 5 parts by weight or more and 30 parts by weight or less of monodispersed PMMA particles (beads) having an average particle (bead) diameter of 18 to 30 μm against 100 parts by weight of resin component as particles for forming the illumination. Through this, the charging characteristics become better, and image inferiority, such as horizontal suji (horizontal linear pattern), becomes difficult to occur. As the beads, the PMMA particles have good charging characteristics, and the particle diameter has a constant size. By using particles having a relatively large size, the charging characteristics become better since a proper gap is formed in the NIP of a contact portion between the photosensitive body 300 and the charging roller 520 to improve the charging performance.

Hereinafter, various examples of a charging roller according to an example of the present disclosure will be described. However, the present disclosure is not limited to the following examples. Further, the following comparative examples are presented to highlight the specific construction or feature of the present disclosure, but they should not be understood as the related art technology or background technology. In the same manner as the examples, the comparative examples should be understood to present specific disclosing types of the present disclosure.

[Charging Roller Production]

(1) Elastic Layer Production

A shaft obtained by spreading adhesives on the shaft (stainless steel bar having electroless-nickel-plated surface) having a diameter of 8 mm and an overall length of 324 mm and drying the spread adhesives was used as a support. After 100 parts by weight of epichlorohydrin rubber (product name: DG, Daiso product), 20 parts by weight of calcium carbonate as a filler, 2 parts by weight of carbon, 5 parts by weight of zinc oxide, and 2 parts by weight of ionic conducting agent were arranged and mixed for 20 minutes in a closed type mixer, 1.5 parts by weight of vulcanization accelerator DM, 1.2 parts by weight of TRA, and 1.0 parts by weight of Sulphur as a crosslinker were added and mixed for 15 minutes on an open roll. This rubber composition and the shaft were pushed out using a crosshead rubber extruder to form a roller having an outer diameter of about 13 mm. After performing a vulcanization process at 160 degrees for 1.5 hours in a vulcanization tube, both ends of the rubber were cut by a cutter, and an abrasive process was performed with respect to the rubber surface to form a roller having a center portion having an outer diameter of 12 mm (crown shape_end portion of 11.9 mm). Thereafter, the surface was cleaned and dried, and irradiated with ultraviolet rays to produce an elastic layer.

(2) Coating Layer Production

Example 1

A paint for surface coatings was prepared by dispersing 45.46 parts by weight of aliphatic polyester polyol (A-1) [product of Daicel Chemical Industries: PCL320AL: molecular weight 3000, OH v 84 KOH mg/g, tri-function], 19.48 parts by weight of polyoxyethylene polyoxypropylene polyol (B-1) [product of Mitsui Chemicals & SKC Polyurethanes Inc.: Y8331: EO 70 mol %, molecular weight 5500, OH v 31 KOH mg/g, tri-function], 58.43 parts by weight of nureito modified HDI (I-1) D660 [product of Aekyung Chemical Co., Ltd.: nonvolatile ingredient 60%, NCO 8.5%, dissociation temperature 130° C.—blocking agent methyl ethyl ketone oxime], 2 parts by weight of carbon black (CB-1) [product of Mitsubishi Corporation: MA 100], 1 part by weight of ionic conducting agent (Ion-1) [product of 3M Company: FC-4400, (n-Bu)$_3$MeN+—N(SO$_2$CF$_3$)$_2$], and 230 parts by weight of methyl ethyl ketone (MEK).

The surface of a roller having an electric elastomer layer was coated with the paint for the surface layer by a dipping method. After drying by wind the painted roller for 10 minutes, a charging roller was obtained by drying the painted roller at 160° C. for one hour using an oven.

In addition, the mixing ratio of the nureito modified HDI was determined by calculating the mole ratio ([NCO]/[OH]) as 1.5 with the mixing ratio of polyester polyol and polyether polyol of 7:3.

The material ratios used in examples 2 to 6 and comparative examples 1 to 7 were presented in Table 1 and Table 2. Charging rollers were prepared in the same manner as example 1 except for mixing changes described in Table 1 and Table 2 based on example 1. The results of evaluation were presented in Table 1 and Table 2.

Specifically, used materials are as follows.
Polyester Polyol (A)
A-1: aliphatic polyester polyol PCL320AL [product of Daicel Chemical Industries]
A-2: polycaprolactone polyol PCL308 [product of Daicel Chemical Industries]
Polyether Polyol (B)
B-1: polyoxyethylene polyoxypropylene polyol Y8331 [product of Mitsui Chemicals & SKC Polyurethanes Inc.]
B-2: polyoxyethylene polyoxypropylene polyol DE-4000 E [product of Mitsui Chemicals & SKC Polyurethanes Inc.]
B-3: polyoxyethylene polyoxypropylene polyol EP505S [product of Mitsui Chemicals & SKC Polyurethanes Inc.]
B-4: polyoxyethylene polyol PEG4000 [product of Toho Chemical Industry Co., Ltd.]
B-5: polyoxyethylene polyoxypropylene polyol DE4020 [product of Mitsui Chemicals & SKC Polyurethanes Inc.]
B-6: polyoxyethylene polyoxypropylene polyol Y3328 [product of Mitsui Chemicals & SKC Polyurethanes Inc.]
Isocyanate
I-1: nureito modified HDI (I-1) D660 [product of Aekyung Chemical Co., Ltd.]
Ionic Conducting Agent
Ion-1: FC-4400 [product of 3M Company: ionic liquid, (n-Bu)$_3$MeN+—N(SO$_2$CF$_3$)$_2$]
Carbon
CB-1: MA-100 [product of Mitsubishi Chemical Corporation]
Particles for Forming Illumination
PMMA-1: SSX-127 [product of Sekisui Plastics Co., Ltd: crosslinking poly(methyl methacrylate), particle diameter 27 m, monodispersed, SSX 120 [particle diameter 20 μm]]

According to examples 1 to 6, in which a urethane resin obtained by reacting a polyol mixture, which contained polyester polyol and polyether polyol having 60% by weight or more and 90% by weight or less of ethylene oxide (EO) content, with polyisocyanate became a matrix resin (main component resin), the composition used to form the coating layer had no tackiness or minute tackiness. In contrast, according to comparative examples 1 and 2, in which polyester polyol and polyoxyethylene polyoxypropylene polyol having less than 60% by weight of ethylene oxide (EO) content were used, curing was insufficient with strong tackiness, and thus the produced charging roller was unfit. Further, according to comparative examples 1 and 2, the surface curing was insufficient, and it was not possible to measure the surface hardness and the surface resistance. The charging roller produced using the polyethylene glycol (EO 100%) had strong crystallization and high hardness, and a condensate was observed on the surface of the charging roller. As a result, the produced charging roller was unfit. According to comparative examples 4 to 7 in which polyester polyol was not used, but polyether polyol was singly used, the tackiness remained although the ethylene oxide (EO) content was 60% by weight or more and 90% by weight or less, and thus the produced charging roller was unfit.

TABLE 1

|      | Embodiment 1 | Embodiment 2 | Embodiment 3 | Embodiment 4 | Embodiment 5 | Embodiment 6 | Comparative Example 1 | Comparative Example 2 | Comparative Example 3 |
|------|------|------|------|------|------|------|------|------|------|
| A-1  | 45.46 | 34.34 | 21.87 | 34.63 | 32.66 |       | 34.63 | 34.63 | 34.63 |
| A-2  |       |       |       |       |       | 60.57 |       |       |       |
| B-1  | 19.48 | 34.34 | 51.03 |       |       | 25.96 |       |       |       |
| B-2  |       |       |       | 34.63 |       |       |       |       |       |
| B-3  |       |       |       |       | 32.66 |       |       |       |       |
| B-5  |       |       |       |       |       |       | 34.63 |       |       |
| B-6  |       |       |       |       |       |       |       | 34.63 |       |
| B-4  |       |       |       |       |       |       |       |       | 34.63 |
| I-1  | 58.43 | 52.18 | 45.16 | 51.24 | 57.81 | 166.67 | 51.24 | 51.24 | 51.24 |
| CB-1 | 2 | 2 | 2 | 2 | 2 | 2 | 2 | 2 | 2 |
| Ion-1 | 1 | 1 | 1 | 1 | 1 | 1 | 1 | 1 | 1 |
| MEK  | 230 | 230 | 230 | 230 | 230 | 200 | 230 | 230 | 230 |

TABLE 1-continued

| | Embodiment 1 | Embodiment 2 | Embodiment 3 | Embodiment 4 | Embodiment 5 | Embodiment 6 | Comparative Example 1 | Comparative Example 2 | Comparative Example 3 |
|---|---|---|---|---|---|---|---|---|---|
| A:B | 7:3 | 5:5 | 3:7 | 7:3 | 7:3 | 7:3 | 7:3 | 7:3 | 7:3 |
| [NCO]/[OH] | 1.5 | 1.5 | 1.5 | 1.5 | 1.5 | 1.5 | 1.5 | 1.5 | 1.5 |
| Tackiness | ◎ | ◎ | ◎ | ◎ | ○ | ◎ | X | X | ◎ |
| Surface hardness | 56 | 53 | 51 | 50 | 57 | 60 | Measurement X | Measurement X | 71 |
| Surface resistance | 5.5E+07 | 3.2E+07 | 1.7E+07 | 1.5E+07 | 4.7E+07 | 9.2E+07 | Measurement X | Measurement X | 4.5E+07 |
| Volume resistance | 5.0E+05 | 1.5E+05 | 1.0E+05 | 1.2E+05 | 3.5E+05 | 7.2E+05 | — | — | 7.8E+05 |

TABLE 2

| | Comparative Example 4 | Comparative Example 5 | Comparative Example 6 | Comparative Example 7 |
|---|---|---|---|---|
| B-1 | 80.26 | 75.53 | | |
| B-2 | | | 81.63 | 76.92 |
| B-5 | | | | |
| I-1 | 32.91 | 40.79 | 30.61 | 38.46 |
| CB-1 | 2 | 2 | 2 | 2 |
| Ion-1 | 1 | 1 | 1 | 1 |
| MEK | 230 | 230 | 230 | 230 |
| A:B | 0:10 | 0:10 | 0:10 | 0:10 |
| [NCO]/[OH] | 1.5 | 2.0 | 1.5 | 2.0 |
| Tackiness | Δ | Δ | X | Δ |
| Surface hardness | 43 | 47 | 40 | 45 |
| Surface resistance | 9.80E+06 | 2.10E+07 | 9.50E+06 | 1.90E+07 |
| Volume resistance | 1.0E+05 | 2.3E+05 | 1.2E+05 | 2.5E+05 |

[Charging Roller for Image Evaluation]

In example 7, a charging roller was prepared in the same manner as in example 1 by dispersing 10 parts by weight of acrylic resin particles (PMMA-1):SSX-127 on a paint for preparing a coating layer.

The prepared charging roller had no surface tackiness, and the background image was good. Further, the prepared charging roller had good horizontal suji (horizontal linear pattern) and good durability.

The mixing ratios of materials used in examples 7 to 10 and comparative examples 8 to 10 were presented in Table 3.

Charging rollers were prepared as in examples 8 to 10 and comparative examples 8 to 10, and the same evaluation was performed. The results of evaluation were summarized in Table 4.

TABLE 3

| | Embodiment 7 | Embodiment 8 | Embodiment 9 | Embodiment 10 | Comparative Example 8 | Comparative Example 9 | Comparative Example 10 |
|---|---|---|---|---|---|---|---|
| A-1 | 45.45 | 50.57 | 40.7 | 45.45 | 60.03 | 69.26 | |
| A-2 | | | | | | | 39.28 |
| B-1 | 19.48 | 12.64 | 17.44 | 19.48 | | | |
| I-1 | 58.43 | 61.30 | 69.76 | 58.43 | 66.62 | 51.24 | 101.20 |
| CB-1 | 2 | 2 | 2 | 2 | 2 | 2 | 2 |
| Ion-1 | 1 | 1 | 1 | 1 | 1 | 1 | 1 |
| MEK | 230 | 230 | 230 | 230 | 230 | 230 | 200 |
| SSX-127 | 10 | 10 | 10 | | 10 | 10 | 10 |
| SSX-120 | | | | 10 | | | |
| A:B | 7:3 | 8:2 | 7:3 | 7:3 | 10:0 | 10:0 | 10:0 |
| [NCO]/[OH] | 1.5 | 1.5 | 1.5 | 1.5 | 1.5 | 1 | 1.50 |

TABLE 4

| | Charging uniformity Low temperature and humidity environment | | Background image Low temperature and humidity environment | | Horizontal suji image Low temperature and humidity environment | |
|---|---|---|---|---|---|---|
| | Early lifetime | 50 kp | Early lifetime | 50 kp | Early lifetime | 50 kp |
| Embodiment 7 | ◎ | ◎ | ◎ | ◎ | ◎ | ◎ |
| Embodiment 8 | ◎ | ○ | ◎ | ○ | ◎ | ○ |
| Embodiment 9 | ◎ | ○ | ◎ | Δ | ◎ | ○ |
| Embodiment 10 | ◎ | ○ | ◎ | ○ | ◎ | Δ |

TABLE 4-continued

|  | Charging uniformity Low temperature and humidity environment | | Background image Low temperature and humidity environment | | Horizontal suji image Low temperature and humidity environment | |
| --- | --- | --- | --- | --- | --- | --- |
|  | Early lifetime | 50 kp | Early lifetime | 50 kp | Early lifetime | 50 kp |
| Comparative Example 8 | ◎ | Δ | ◎ | X | ◎ | Δ |
| Comparative Example 9 | ◎ | Δ | ◎ | X | ◎ | Δ |
| Comparative Example 10 | ◎ | Δ | ◎ | X | ◎ | Δ |

[Measurement Evaluation Basis]

1. Tackiness evaluation: The surface of the charging roller was evaluated through touching the same.

◎: no tackiness, ○: fine tackiness

Δ: somewhat tackiness, x: severe tackiness

2. Surface hardness: Hardness measurement using micro-IRHD hardness tester (Hildebrand GmbH) (normal temperature & normal humidity (NN) environment)

3. Surface resistance: Surface resistance measurement (measurement environment: NN environment & leaving alone for 8 hours) using a surface resistance meter (Mitsubishi Chemical Corporation Hiresta_UP)

[Image Evaluation Method and Basis]

An image was evaluated by outputting the image using an electrophotographic device (X4300LX, product of Samsung Electronics Co., Ltd.) after completion of an initial image output and durability text of 50 kp.

1. Charging uniformity evaluation: Uniformity of a dot size of an image was evaluated.

◎: good uniformity, ○: fine imbalance

Δ: imbalance (image quality deterioration), x: bad uniformity (no good (NG) image quality)

2. Background (B/G) image: Test by naked eyes and measure (image density) a background (B/G) by outputting an image.

◎: non-occurrence (0.0), ○: fine occurrence (0.01)

Δ: somewhat occurrence (0.02), x: occurrence (0.03 or more)

3. Image horizontal suji: Image identification by naked eyes

◎: non-occurrence, ○: fine occurrence,

Δ: somewhat occurrence (image quality deterioration), x: occurrence (no good (NG) image quality)

The image forming apparatus using the charging roller according to the present disclosure can maintain stable charging characteristics even in case of long-term use in all use environments form low-temperature and low-humidity environmental atmosphere to high-temperature and high-humidity environmental atmosphere, and can obtain a good stable image through the maintenance of the charging characteristics.

The foregoing examples and advantages are merely examples and are not to be construed as limiting the present disclosure. The present teaching can be readily applied to other types of apparatuses. Also, the description of the examples of the present disclosure is intended to be illustrative, and not to limit the scope of the claims, and many alternatives, modifications, and variations will be apparent to those skilled in the art.

The invention claimed is:

1. A charging roller for an image forming apparatus, comprising:
   a shaft;
   an elastic layer formed around the shaft; and
   a coating layer formed on the elastic layer,
   wherein
   the coating layer includes a urethane resin formed by crosslinking of a polyol mixture with polyisocyanate, and
   the polyol mixture includes
   polyester polyol, and
   polyether polyol having 60% by weight or more and 90% by weight or less of an ethylene oxide content.

2. The charging roller as claimed in claim 1, wherein a mass ratio between the polyester polyol and the polyether polyol having 60% by weight or more and 90% by weight or less of the ethylene oxide content is in a range of 8:2 to 2:8.

3. The charging roller as claimed in claim 1, wherein a ratio of isocyanate groups (NCO) of the polyisocyanate to hydroxyl groups (OH) of the polyol mixture ([NCO]/[OH]) is within a range of 1.2 to 2.5.

4. The charging roller as claimed in claim 1, wherein the coating layer further includes at least one conducting agent selected from an ionic conducting agent and an electronic conducting agent.

5. The charging roller as claimed in claim 4, wherein the ionic conducting agent is an ionic liquid having a following chemical structure

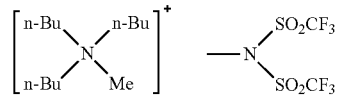

where n-Bu denotes n-Butyl, and Me denotes Methyl.

6. The charging roller as claimed in claim 4, wherein the electron conducting agent is a carbon black.

7. The charging roller as claimed in claim 4, wherein the coating layer includes the ionic conducting agent, and
   an amount of the ionic conducting agent is within a range of 0.5 to 5 parts by weight per 100 parts by weight of the urethane resin.

8. The charging roller as claimed in claim 4, wherein the coating layer includes the electronic conducting agent, and
   an amount of the electron conducting agent is within a range of 0.5 to 10 parts by weight per 100 parts by weight of the urethane resin.

9. The charging roller as claimed in claim 1, wherein the polyisocyanate is a hexamethylene diisocyanate trimer.

10. The charging roller as claimed in claim 1, wherein the polyisocyanate is a blocked polyisocyanate having a dissociation temperature equal to or higher than 120° C. and equal to or lower than 160° C.

11. The charging roller as claimed in claim 1, wherein the coating layer further comprises particles forming an unevenness on a surface of the coating layer, and an amount of the particles is included in a range of 5 to 30 parts by weight per 100 parts by weight of the urethane resin.

12. The charging roller as claimed in claim 11, wherein the particles include a monodispersed poly(methyl methacrylate) (PMMA) particle having a diameter included in a range of 18 to 30 µm.

13. An image forming apparatus comprising a charging roller according to claim 1.

* * * * *